United States Patent
Konda et al.

(10) Patent No.: US 11,496,440 B2
(45) Date of Patent: Nov. 8, 2022

(54) SYSTEMS, METHODS, AND MEDIA FOR INTELLIGENT SPLIT-TUNNELING

(71) Applicant: McAfee, LLC, Santa Clara, CA (US)

(72) Inventors: Tirumaleswar Reddy Konda, Bengaluru (IN); Harsha R. Joshi, Bengaluru (IN); Eric Wuehler, Beaverton, OR (US); Shashank Jain, Bangalore (IN)

(73) Assignee: McAfee, LLC, San Jose, CA (US)

(*) Notice: Subject to any disclaimer, the term of this patent is extended or adjusted under 35 U.S.C. 154(b) by 456 days.

(21) Appl. No.: 16/403,881

(22) Filed: May 6, 2019

(65) Prior Publication Data
US 2020/0304459 A1 Sep. 24, 2020

(30) Foreign Application Priority Data
Mar. 22, 2019 (IN) .............................. 201941011245

(51) Int. Cl.
*H04L 29/12* (2006.01)
*H04L 12/46* (2006.01)
*H04L 29/06* (2006.01)
(Continued)

(52) U.S. Cl.
CPC ...... *H04L 61/2592* (2013.01); *H04L 12/4633* (2013.01); *H04L 12/4641* (2013.01);
(Continued)

(58) Field of Classification Search
CPC .............. H04L 12/4641; H04L 12/4633; H04L 29/06836; H04L 61/1511; H04L 61/1576;
(Continued)

(56) References Cited

U.S. PATENT DOCUMENTS

2013/0322255 A1 12/2013 Dillon
2014/0344917 A1* 11/2014 Parla ....................... H04L 45/74
726/15
(Continued)

FOREIGN PATENT DOCUMENTS

KR 1020170057357 5/2017

OTHER PUBLICATIONS

E. Rescorla. "Request for Comments (RFC) 8446: The Transport Layer Security (TLS) Protocol Version 1.3", Aug. 2018, 160 pages. (Year: 2018).*

(Continued)

*Primary Examiner* — George C Neurauter, Jr.
(74) *Attorney, Agent, or Firm* — Byrne Poh LLP

(57) ABSTRACT

Mechanisms for split tunneling are provided. The mechanisms identify user devices and determine that communications for a first device of the user devices are to be tunneled. These mechanisms also receive a DNS request from a second device of the user devices, modify the DNS request to request meta information corresponding to a domain identified in the DNS request, and send the DNS request to a DNS server. The mechanisms further receive a response to the DNS request, wherein the response includes the meta information, determine that communications for the second device are not to be tunneled based at least in part on the meta information, and cause the communications for the first device to be tunneled and the communications for the second device to not be tunneled.

20 Claims, 9 Drawing Sheets

(51) Int. Cl.
*H04L 29/08* (2006.01)
*H04L 61/2592* (2022.01)
*H04L 61/45* (2022.01)
*H04L 61/4511* (2022.01)
*H04L 9/40* (2022.01)
*H04L 67/146* (2022.01)
*H04L 67/147* (2022.01)
*H04L 67/12* (2022.01)

(52) U.S. Cl.
CPC .... *H04L 29/06836* (2013.01); *H04L 61/1511* (2013.01); *H04L 61/1576* (2013.01); *H04L 63/029* (2013.01); *H04L 63/0272* (2013.01); *H04L 63/0414* (2013.01); *H04L 63/0876* (2013.01); *H04L 63/102* (2013.01); *H04L 63/126* (2013.01); *H04L 63/166* (2013.01); *H04L 63/20* (2013.01); *H04L 67/146* (2013.01); *H04L 67/147* (2013.01); *H04L 67/12* (2013.01)

(58) Field of Classification Search
CPC ............. H04L 61/2592; H04L 63/0272; H04L 63/029; H04L 63/0414; H04L 63/0876; H04L 63/102; H04L 63/126; H04L 63/166; H04L 63/20; H04L 67/12; H04L 67/146; H04L 67/147
See application file for complete search history.

(56) References Cited

U.S. PATENT DOCUMENTS

| | | |
|---|---|---|
| 2014/0373090 A1 | 12/2014 | Murgia et al. |
| 2015/0372912 A1 | 12/2015 | Parla et al. |
| 2017/0366395 A1* | 12/2017 | Goldfarb ............. H04L 12/4641 |
| 2018/0069797 A1 | 3/2018 | Williams et al. |
| 2018/0309658 A1* | 10/2018 | Parla .................... H04L 12/4641 |
| 2019/0372937 A1* | 12/2019 | Song ..................... H04L 63/029 |

OTHER PUBLICATIONS

J. Damas and P. Vixie. "Request for Comments (RFC) 6891: Extension Mechanisms for DNS (EDNS(0))", Apr. 2013, 16 pages. (Year: 2013).*

Chromium, "QUIC, a multiplexed stream transport over UDP" https://www.chromium.org/quic.

Kiraly et al., "Traffic Flow Confidentiality in IPsec: Protocol and Implementation", in IFIP International Summer School on the Future of Identity in the Information Society, Aug. 2007, pp. 311-324.

International Search Report and Written Opinion dated Jul. 9, 2020 in International Patent Application No. POT/US2020/023922, pp. 1-10.

* cited by examiner

SYSTEMS, METHODS, AND MEDIA FOR INTELLIGENT SPLIT-TUNNELING

CROSS-REFERENCE TO RELATED APPLICATIONS

This application claims the benefit of Indian Provisional Patent Application No. 201941011245, filed Mar. 22, 2019, which is hereby incorporated by reference herein in its entirety.

BACKGROUND

With rapid growth of Internet of Things (IoT) devices in home, enterprise and industrial environments, concerns about user privacy and security have grown year after year. Vendor spread and a lack of proper security and privacy measures from a large number of IoT device vendors are posing major challenges. Headless IoT devices (e.g., sleep monitors, lightbulbs, voice assistants, etc.) usually serve a well-defined use-case: they talk to specific servers at specific intervals, or upon the occurrence of specific events, and have easily identifiable communication patterns.

A critical problem is to identify privacy risks that these smart home devices pose by their vulnerability to leaking out private user information to eavesdroppers. This problem gets amplified by the fact that each IoT device poses a different security and privacy risk and needs specialized mechanism to protect it. Furthermore, many IoT device manufacturers have not considered user privacy into their product design and the end-user of the product is usually unaware of such privacy leaks and the consequences of such leaks.

For endpoint devices like mobile phones, laptop computers, and desktop computers, consumers have been using virtual private network (VPN) solutions for a very long time to secure their traffic from prying eyes of eavesdroppers. However, a big drawback of many existing consumer VPN solutions is that they either tunnel all of the traffic flows from the endpoint device or do not provide privacy for the traffic by-passing the tunnel. For instance, a user must manually select which apps require tunneling and which apps can by-pass tunneling. Unfortunately, many end users may not be aware of the privacy implications of apps, and therefore will not know which apps require tunneling and which apps can by-pass tunneling. If all the traffic flows from the endpoint device are tunneled, it results in degradation of path characteristics like overall throughput, latency and jitter, and hence hampers end user experience. For hand held devices, like mobile phones and other portable devices, VPN solutions add to additional power consumption and battery drain. Also, since most of VPN solutions are metered, tunneling every flow increases the data usage and overall cost for the users.

Accordingly, new mechanisms for intelligent split-tunneling are desirable.

SUMMARY

In accordance with some embodiments, systems, methods, and media for intelligent split-tunneling are provided. More particularly, in some embodiments, systems for split tunneling are provided, the systems comprising: a memory; and a hardware processor coupled to the memory and configured to: identify a plurality of user devices; determine that communications for a first device of the plurality of user devices are to be tunneled; receive a DNS request from a second device of the plurality of user devices; modify the DNS request to request meta information corresponding to a domain identified in the DNS request; send the DNS request to a DNS server; receive a response to the DNS request including the meta information; determine that communications for the second device are not to be tunneled based at least in part based on the meta information; and cause the communication for the first device to be tunneled and the communications for the second device to not be tunneled.

In some embodiments, methods for split tunneling are provided, the methods comprising: identifying a plurality of user devices using a hardware processor; determining that communications for a first device of the plurality of user devices are to be tunneled using the hardware processor; receiving a DNS request from a second device of the plurality of user devices using the hardware processor; modifying the DNS request to request meta information corresponding to a domain identified in the DNS request using the hardware processor; sending the DNS request to a DNS server using the hardware processor; receiving a response to the DNS request including the meta information using the hardware processor; determining that communications for the second device are not to be tunneled based at least in part based on the meta information using the hardware processor; and causing the communication for the first device to be tunneled and the communications for the second device to not be tunneled using the hardware processor.

In some embodiments, non-transitory computer-readable media containing computer executable instructions that, when executed by a processor, cause the processor to perform a method for split tunneling are provided, the method comprising: identifying a plurality of user devices; determining that communications for a first device of the plurality of user devices are to be tunneled; receiving a DNS request from a second device of the plurality of user devices; modifying the DNS request to request meta information corresponding to a domain identified in the DNS request; sending the DNS request to a DNS server using the hardware processor; receiving a response to the DNS request including the meta information; determining that communications for the second device are not to be tunneled based at least in part based on the meta information; and causing the communication for the first device to be tunneled and the communications for the second device to not be tunneled.

DETAILED DESCRIPTION

In accordance with some embodiments, mechanisms (such as systems, methods, and media) for automated intelligent split tunneling are provided. In some embodiments, these mechanisms not only provide privacy and security for susceptible IoT device traffic, but also enhance the user experience by reducing cost, latency and increasing network throughput.

Figure 1:
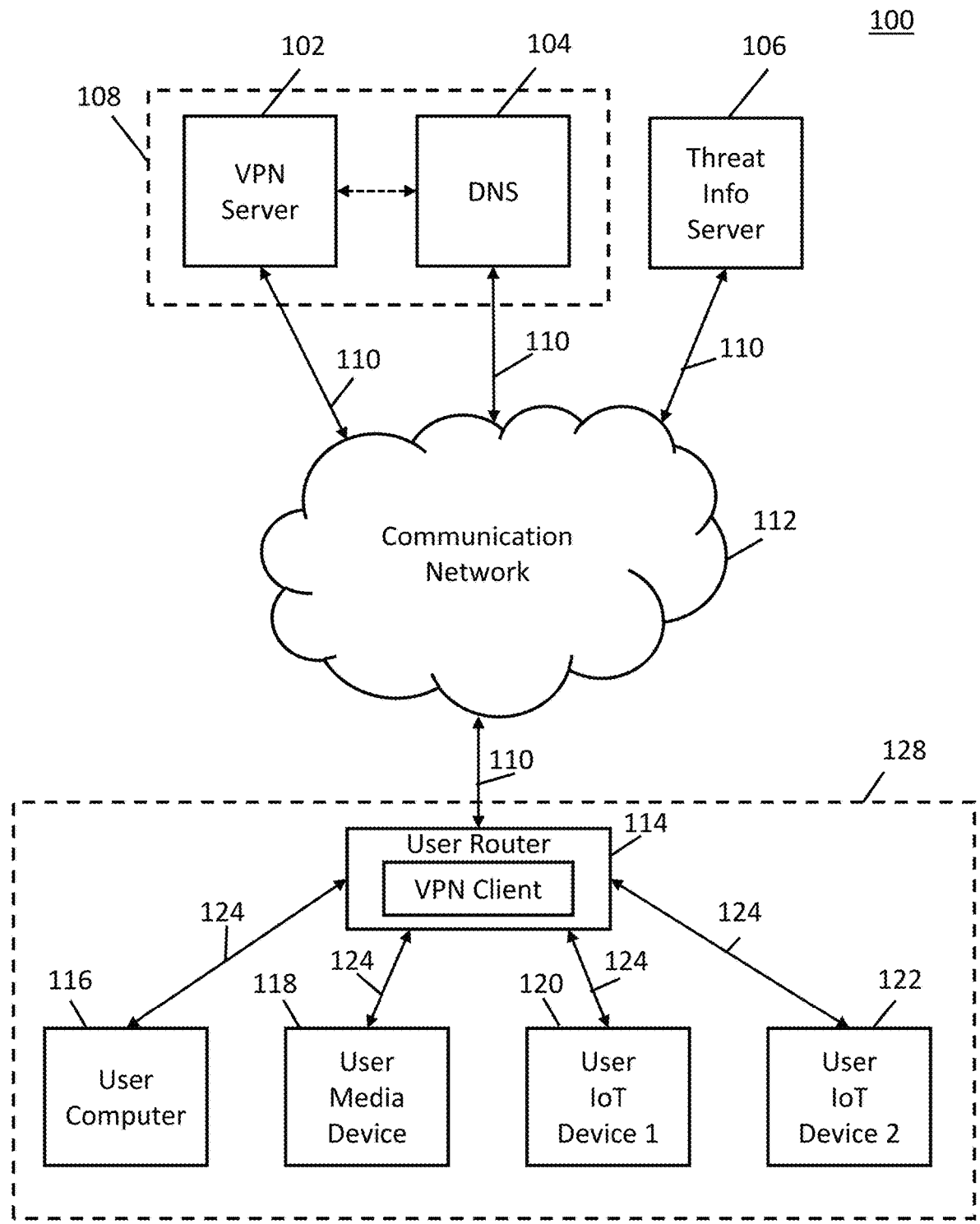
FIG. 1 illustrates an example of hardware that can be used in accordance with some embodiments.

Turning to FIG. 1, an example 100 of hardware for intelligent split level tunneling that can be used in accordance with some embodiments of the disclosed subject matter is shown. As illustrated, hardware 100 can include a Virtual Private Network (VPN) server 102, a Domain Name Server (DNS) 104, a threat information server 106, a communication network 112, a user router 114, a user computer 116, a user media device 118, and user Internet-of-Things (IoT) devices 120 and 122.

VPN server 102 can be any suitable virtual private network server for providing one or more VPNs in conjunction with one or more VPN clients.

DNS 104 can any suitable domain name server.

In some embodiments, VPN server 102 and DNS 104 can be implemented on a common network or platform and a direct link (such as network link, dial-up link, wireless link, hard-wired link, any other suitable communications link, or any suitable combination of such links) can be provided between them.

Threat information server 106 can any suitable server for gathering and distributing threat information. For example, in some embodiments, threat information server can gather and distribute information on web sites that are vulnerable to attack, that are suspected of being compromised, that do not provide adequate security, and/or that otherwise expose users to risk that their private information may be compromised. As another example, in some embodiments, threat information server can gather and distribute information on web sites that are configured to protect a user's private information. In some embodiments, threat information server 106 can be configured to distribute feeds of network meta-information associated with a fully quantified domain name (FQDN) to DNS 104.

In some embodiments, DNS messages (such as DNS requests and DNS responses) between DNS 104 and one or more of user computer 116, user media device 118, and user IoT devices 120 and 122 can be tunneled by user router 114 and VPN server 102.

In some embodiments, a DNS stub resolver on user router 114 adds an EDNS option to DNS requests to be sent, requesting DNS 104 to provide the network meta-information associated with the FQDN conveyed in the DNS request. The network meta-information can include any suitable information associated with the FQDN, such as domain category, supported transport layer security (TLS) versions, and if other domains are hosted on the Internet Protocol (IP) address returned in the DNS response, in some embodiments. In some embodiments, threat information server 106 can learn the TLS versions supported by the servers hosted on a domain, and if other domains are hosted on the IP address returned in the DNS response and feed this information to DNS 104. DNS 104 can then use the feeds from threat information server 106 to learn domain category associated with a FQDN, the network meta-information and add an EDNS option in the DNS response conveying the network meta-information in some embodiments. For example, in some embodiments, the domain category conveyed in the EDNS option can indicate that the domain category is a content delivery network (CDN) or content server. Category information conveyed in an EDNS option can be structured and standardized so that it can be encoded in the EDNS option and processed by a VPN client on user router 114 in some embodiments.

Communication network 112 can be any suitable combination of one or more wired and/or wireless networks in some embodiments. For example, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

VPN server 102, DNS 104, threat information server 106, and user router 114 can be connected by one or more communications links 110 to communication network 112. The communications links can be any communications links suitable for communicating data among VPN server 102, DNS 104, threat information server 106, user router 114, and communication network 112, such as network links, dial-up links, wireless links, hard-wired links, any other suitable communications links, or any suitable combination of such links.

User router 114 can be any suitable router. In some embodiments, user router 114 can be configured to provide a VPN client and perform the processes illustrated in, and described herein in connection with, FIGS. 3 and 9.

User computer 116 can be any suitable computer, such as a desk top computer, a laptop computer, a tablet computer, a smart phone, and/or any other suitable computer device.

User media device 118 can be any suitable device for streaming media, such as a media player box, a media player dongle (which can stream video and audio, video only, or audio only), a smart television, etc.

User IoT devices 120 and 122 can be any suitable Internet of Things devices, such as internet protocol cameras, smart smoke alarms, smart thermostats, smart locks, alarms, sensors, light bulbs, hubs, smart speakers, and/or any other device that can be connected to a computer network.

User computer 116, user media device 118, and user IoT devices 120 and 122 can be connected by one or more communications links 124 to user router 114. The communications links can be any communications links suitable for communicating data among user computer 116, user media device 118, user IoT devices 120 and 122, user router 114, such as network links, dial-up links, wireless links, hard-wired links, any other suitable communications links, or any suitable combination of such links.

In some embodiments, user computer 116, user media device 118, user IoT devices 120 and 122, communications links 124, and user router 114 can form or be part of a local area network 128.

Although one VPN server 102, one DNS 104, one threat information server 106, one user router 114, one user computer 116, one user media device 118, and two user IoT devices 120 and 122 are shown in FIG. 1 to avoid over-complicating the figure, any suitable numbers (including zero in some embodiments) of these devices can be used in some embodiments.

Figure 2:
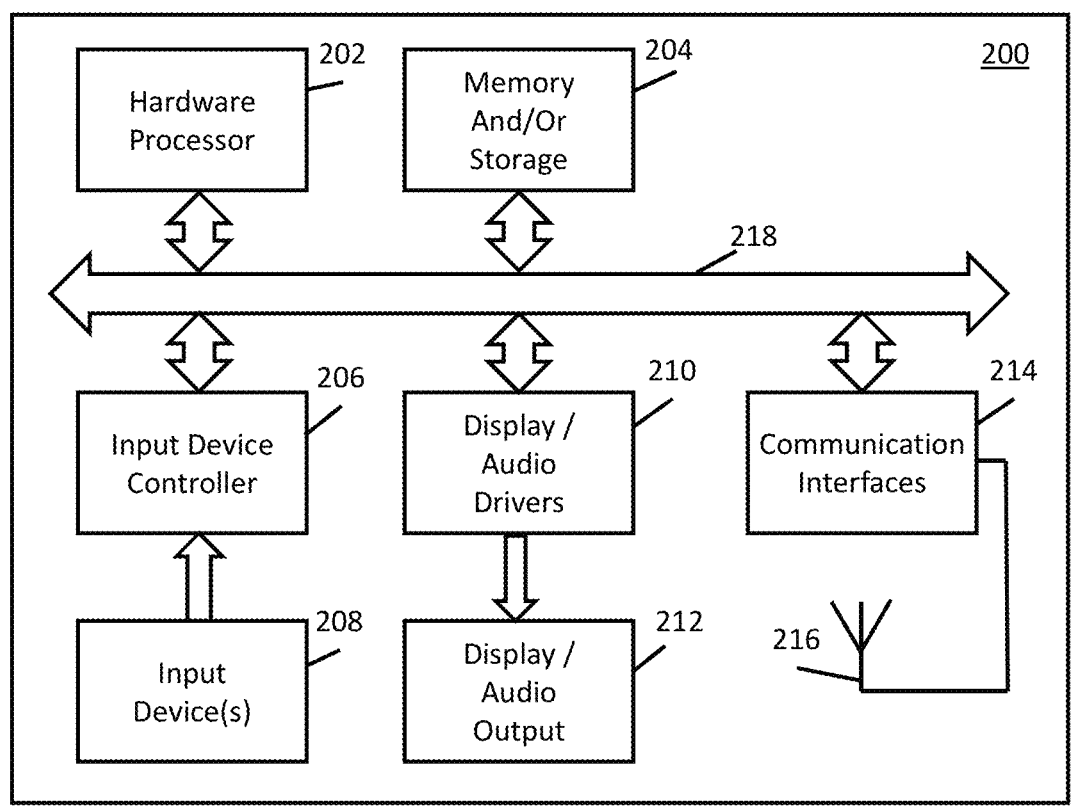
FIG. 2 illustrates an example of more detailed hardware that can be used to implement some components of the hardware of FIG. 1 in accordance with some embodiments.

VPN server 102, DNS 104, threat information server 106, user router 114, user computer 116, user media device 118, and/or user IoT devices 120 and 122 can be implemented using any suitable hardware in some embodiments. For example, in some embodiments, VPN server 102, DNS 104, threat information server 106, user router 114, user computer 116, user media device 118, and/or user IoT devices 120 and 122 can be implemented using any suitable general-purpose computer or special-purpose computer. For example, a user IoT device, such as a smart lock or a smart thermostat, can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from an input device 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
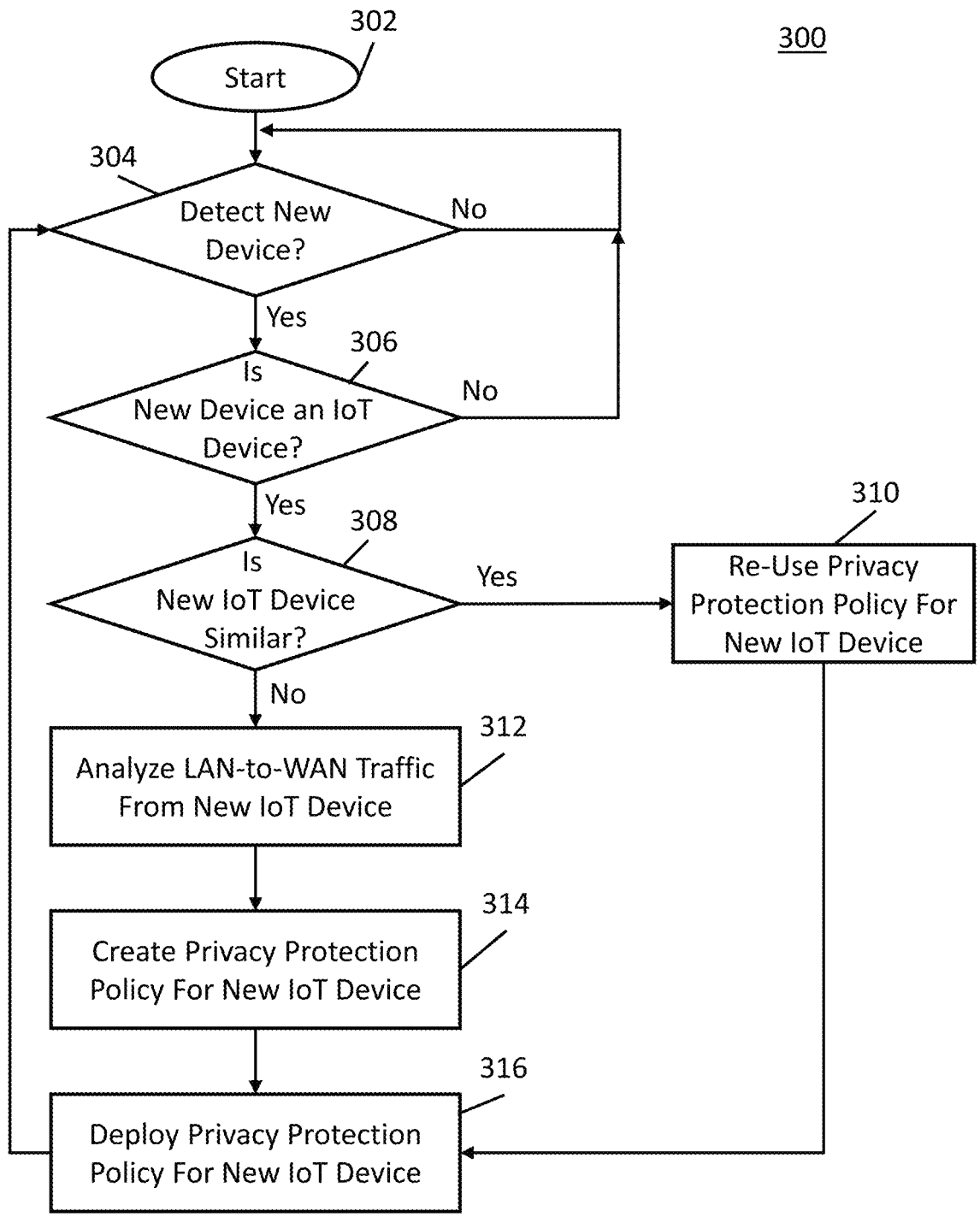
FIG. 3 illustrates an example of a process for creating and deploying privacy protection policies in accordance with some embodiments.

Turning to FIG. 3, an example 300 of a process for creating and deploying a privacy protection policy for one or more IoT devices in accordance with some embodiments is shown. As mentioned above, process 300 can be performed by user router 114 in some embodiments.

As illustrated, after process 300 begins at 302, at 304, process 300, can determine whether a new device has been detected. This determination can be made in any suitable manner in some embodiments. For example, in some embodiments, this determination can be made by detecting traffic to/from an IP address on the LAN not previously seen before.

If it is determined at 304 that a new device has not been detected, then process 300 can loop back to 304 to re-check for a new device. In some embodiments, this loop back may be delayed by any suitable amount of time.

Otherwise, if process 300 determines at 304 that a new device has been detected, then process 300 can branch to 306 at which process 300 can determine whether the new device is an IoT device. This determination can be made in any suitable manner. For example, in some embodiments, process 300 can fingerprint the new device to determine if it is an IoT device. Fingerprinting can be performed in any suitable manner in some embodiments. For example, in some embodiments, a device can be fingerprinted by observing the MAC address of the device, a host name accessed by the device, network discovery probes (e.g., UpnP, MDNS (Bonjour), NetBIOS, and SNMP) used by the device, open ports on the device, user agents used by the device, DNS requests made by the device, DHCP vendor and vendor options used by the device, and network characteristics (e.g., domains visited, content of packets sent/received, inter-packet arrival rate, TTL, etc.) of the device, and/or any other observable traits of the device.

If it is determined at 306 that the new device is not an IoT device, then process 300 can loop back to 304.

Otherwise, if process 300 determines at 306 that the new device is an IoT device, then, at 308, process 300 can determine whether the new IoT device is similar to an existing IoT device. Whether a new IoT device is similar to an existing IoT device can be determined in any suitable manner in some embodiments. For example, in some embodiments, a fingerprint of the new IoT device (which can have been determined in the same manner as the fingerprints described in connection with 306) can be compared to a fingerprint of the existing IoT device (which can have been determined in the same manner as the fingerprints described in connection with 306) to determine if they are similar.

If it is determined at 308 that the new device is similar to an existing IoT device, then process 300 can branch to 310 and re-use the privacy protection policy from the existing IoT device with the new IoT device. Process 300 can re-use the privacy protection policy from the existing IoT device in any suitable manner. For example, in some embodiments, process 300 can assign the policy to the new IoT device or process 300 can create a copy of the policy for the new IoT device.

Otherwise, if it is determined at 308 that the new IoT device is not similar to an existing IoT device, then process 300 can branch to 312 at which it can analyze LAN-to-WAN traffic from the new IoT device to determine if there are any security and privacy threats associated with the traffic. This analysis can be performed in any suitable manner and for any suitable duration, and can be performed on any suitable portion of the LAN-to-WAN traffic from the IoT device.

For example, in some embodiments, statistical analysis of the LAN-to-WAN traffic can reveal the usage patterns the could breach the security and privacy of a user. More particularly, for example, such a statistical analysis can observe the generated packet sizes and inter-arrival times of generated packets in the traffic to determine information that a user may want to keep secure and/or private. For example, popular Internet-Protocol-based home security cameras, upon detecting motion, generate spikes in network traffic and these spikes can be inferred as indicating the presence of a user at the location of the cameras (e.g., the user's home).

Figure 4:
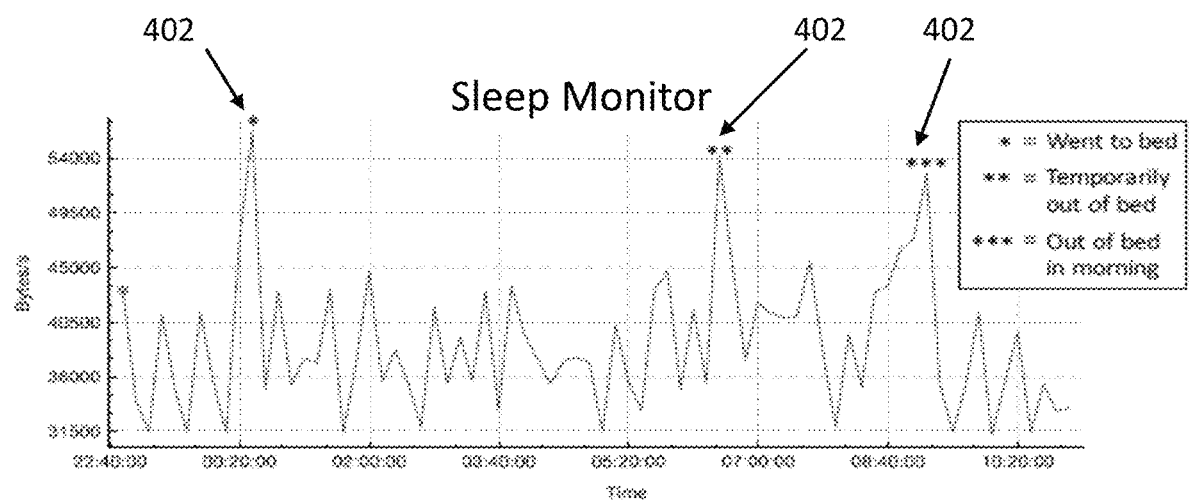
FIGS. 4-8 illustrate examples of ways in which statistical analysis of LAN-to-WAN traffic can reveal usage patterns that could breach the security and privacy of a user of in accordance with some embodiments.
Figure 5:
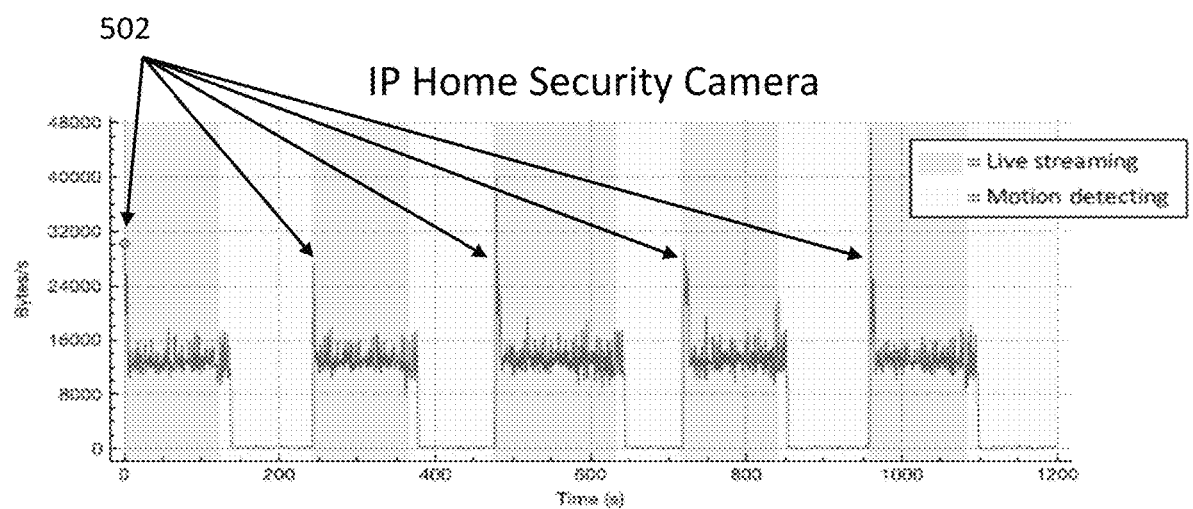
Figure 6:
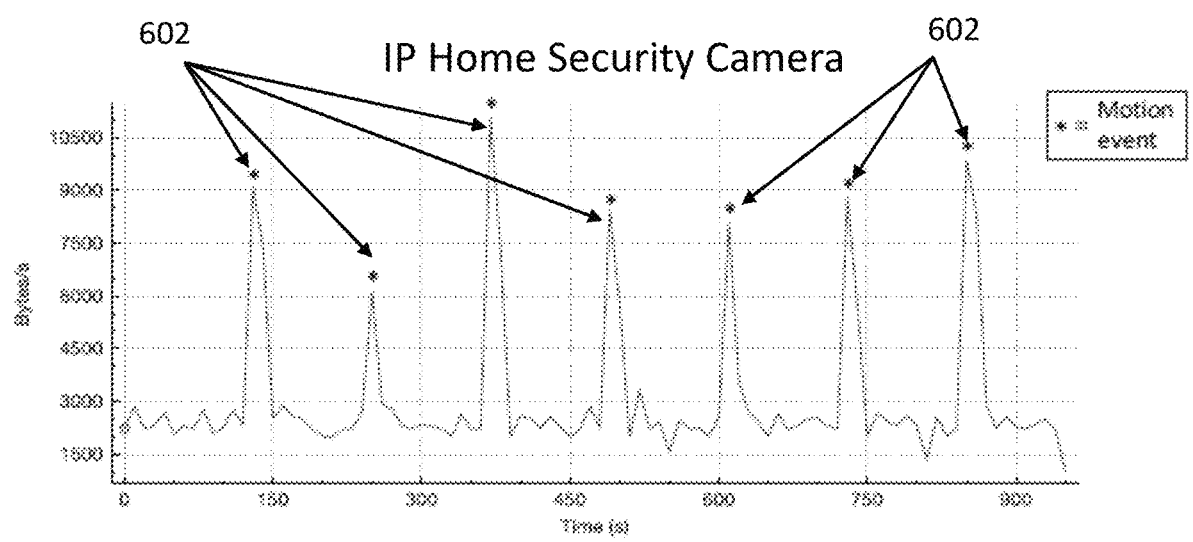
Figure 7:
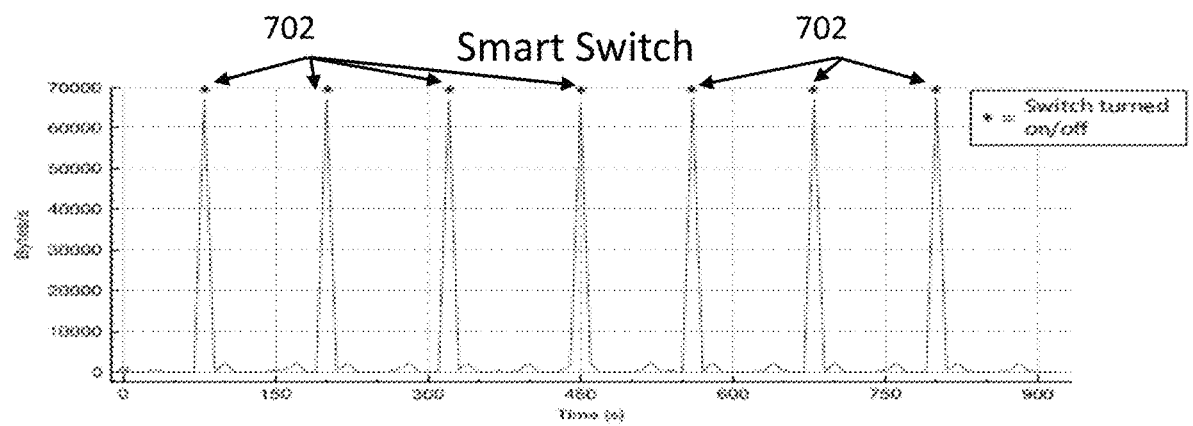
Figure 8:
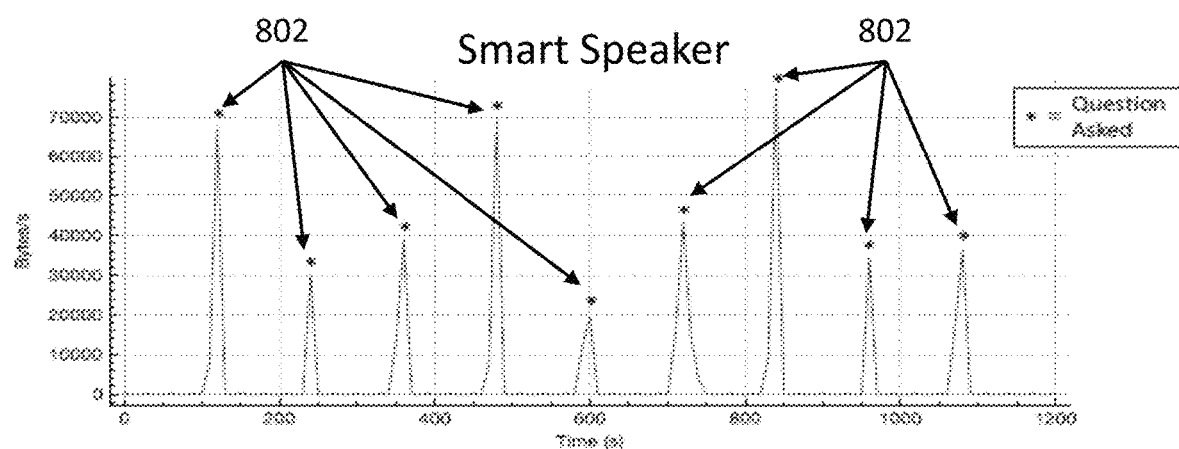

FIGS. 4-8 illustrate examples of ways in which statistical analysis of LAN-to-WAN traffic can reveal usage patterns that could breach the security and privacy of a user. For example, as shown in FIG. 4, statistical analysis of sleep monitor traffic can be used to reveal when a user went to bed at 402, temporarily got out of bed at 404, and got out of bed in the morning at 406. As another example, as shown in FIG. 5, statistical analysis of IP home security camera traffic can be used to reveal when motion is detected at 502. As still another example, as shown in FIG. 6, statistical analysis of IP home security camera traffic can be used to reveal when motion is detected at 602. As yet another example, as shown in FIG. 7, statistical analysis of smart switch traffic can be used to reveal when the switch is turned on or off at 702. As still another example, as shown in FIG. 8, statistical analysis of smart speaker traffic can be used to reveal when a question is asked at 802.

In some embodiments, traffic analysis can be performed within a LAN or a WAN associated with the traffic. For example, in some embodiments, the analysis can be performed by a router (e.g., user router 114) between the LAN and the WAN. As another example, in some embodiments, the analysis can be performed by a server connected to the WAN.

Returning to FIG. 3, following 312, at 314, process 300 can create a privacy protection policy for the new IoT device. Each privacy protection policy can be created in any suitable manner and can include any suitable information in some embodiments.

For example, in some embodiments, a privacy protection policy can include any suitable device information for the IoT device, such as device type, make/model, operating system, software version, update status, and/or any other suitable information related to the IoT device.

As another example, in some embodiments, a privacy protection policy can include any suitable privacy and/or security threat information, such as security threats associated with the IoT device (e.g., the IoT device uses a weak cipher suite, uses insecure SSL versions (e.g., TLS 1.0, TLS 1.1), uses TLS-level compression (e.g., which can be used to extract clear text information (e.g., CRIME attack)), or uses a small size of the public key (e.g., 1024-bit RSA public key)), possible privacy leaks from statistical analysis of traffic patterns, clear text traffic, and/or any other suitable information related to privacy and/or security vulnerabilities of the IoT device.

As still another example, in some embodiments, a privacy protection policy can include any suitable privacy protection policy information, such as a padding policy (determines the length of padding that needs to be added) (e.g., block length padding, full/maximum length padding, random length padding, random block length padding, etc.) to induce stable traffic patterns, a traffic flow continuity policy (which indicates the interval and frequency in which dummy packets (packets with all padding characters) need to be sent from the VPN clients to ensure evenly spread traffic flow patterns), an encryption policy and/or tunneling policy (which indicates the routing configuration that needs to be deployed to forward the traffic exchanged with the IoT device through the tunnel) to protect vulnerable IoT devices, a user policy (which can allow a user to add exceptions for specific devices or override the standard privacy protection policy in place for the IoT device), and/or any other suitable information for protecting the IoT device from being compromised.

After re-using a privacy protection policy at 310 or creating a privacy protection policy at 314, at 316, process 300 can deploy the privacy protection policy. The policy can be deployed in any suitable manner in some embodiments. For example, in some embodiments, as part of deploying the policy, a split tunnel can be created, and traffic exchanged with the IoT device can be forwarded through the tunnel. As another example, in some embodiments, as part of deploying the policy, VPN client and server can be instructed to ensure that each packet is appropriately padded. As still another example, in some embodiments, as part of deploying the policy, as instructed by a traffic flow continuity policy within the privacy protection policy, VPN client and server can exchange dummy packets. As yet another example, in some embodiments, as part of deploying one or more policies, process 300 can notify an administrator of existing security and privacy risks associated with one or more IoT devices, notify the administrator that the one or more policies have been created for the one or more IoT devices, and seek the administrator's consent before deploying the one or more policies to the one or more IoT devices.

After deploying the privacy protection policy at 316, process 300 can loop back to 304.

Figure 9:
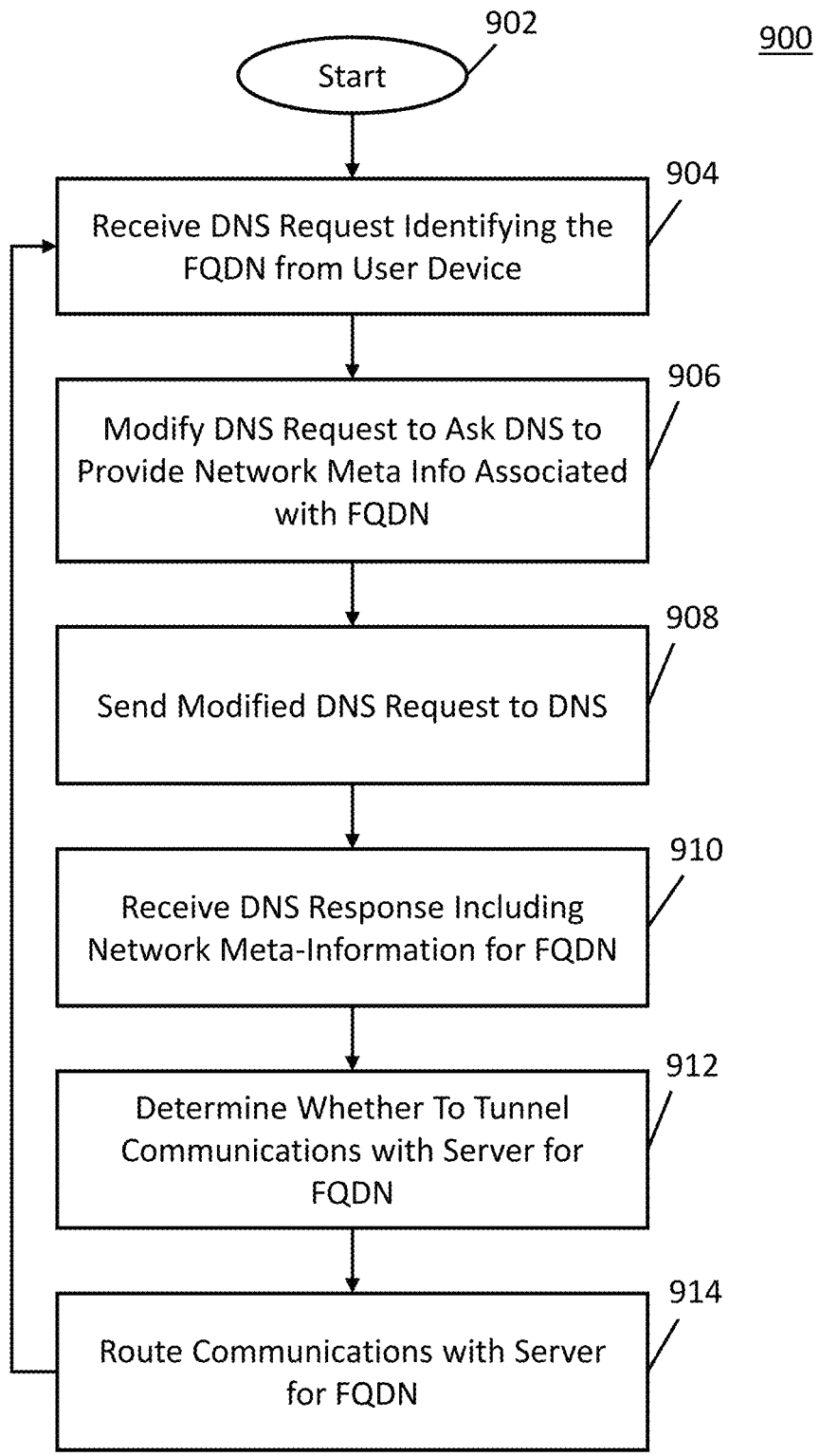
FIG. 9 illustrates an example of a process for determining whether to tunnel communications in accordance with some embodiments.

Turning to FIG. 9, an example 900 of a process for implementing split tunneling on an endpoint device in accordance with some embodiments is shown.

As shown, after process 900 begins at 902, the process can receive a DNS request identifying a FQDN from a user device, such as user computer 116, user media device 118, user IoT device 120, or user IoT device 122. This DNS request can be received in any suitable manner, can have any suitable content, and can be in any suitable format.

Next, at 906, process 900 can modify the DNS request to ask the DNS to provide network meta information associated with the FQDN. The DNS request can be modified in any suitable manner. For example, the DNS request can be modified to add an EDNS option asking for the network meta information, such as a category of the domain of the FQDN, TLS version information, whether other domains are hosted on the FQDN's IP address.

Then, at 908, process 900 can send the modified DNS request to the DNS (e.g., DNS 104). The request can be sent in any suitable manner. For example, in some embodiments, the modified DNS request can be sent to the DNS using a VPN. More particularly, in some embodiments, the DNS request can be sent to the DNS using a VPN client on a user router (e.g., user router 114) to send the DNS request through a VPN server (e.g., VPN server 102) to the DNS.

At 910, process 900 can receive a DNS response including the network meta-information for the FQDN. This response can be received in any suitable manner.

Next, at 912, process 900 can determine whether to tunnel communications with the server for the FQDN. In some embodiments, process 900 can determine whether to tunnel communications based on any suitable criteria or criterion. For example, in some embodiments, process 900 can determine to tunnel flows by default and only not tunnel a flow when certain requirements are met.

For example, in some embodiments, process 900 can determine to not tunnel a flow to a domain when the flow includes a TLS ClientHello message and: (1) the category of the domain is a content delivery network (CDN) (or content server) or an anonymizer, when a used communication protocol prevents eavesdropping, tampering, message forgery, information leakage, etc. (e.g., when (D)TLS version is 1.3), the server name indicator (SNI) conveyed (e.g., in the TLS ClientHello) is encrypted, and reverse DNS of the target IP address for the flow will not allow attackers to determine the actual domain to which the flow is being sent (e.g., when other domains are hosted on the target IP address); or (2) the category of the domain is a content delivery network (CDN) (or content server) or anonymizer, the flow to the domain does not reveal its server certificate information (e.g., when it uses TLS session resumption (TLS 1.2 or later)), and reverse DNS of the target IP address for the flow will not allow attackers to determine the actual domain to which the flow is being sent (e.g., when other domains are hosted on the target IP address).

As another example, in some embodiments, process 900 can determine to not tunnel a flow to a domain when HTTP traffic in the flow is invisible to pervasive monitoring (e.g., when the category of the domain is a data compression proxy).

As still another example, in some embodiments, process 900 can determine to not tunnel a flow to a domain when provide privacy protection obscuring the identity of one peer from the other in an audio or video call is provided. For example, this may be determined to be the case when the category of the domain is TURN server.

As yet another example, in some embodiments, process 900 can determine to not tunnel a flow to a domain when HTTPS is used and the user selects a configuration option to bypass tunneling traffic to specific domain categories (e.g. categories such as General News, Software Technology, etc.)

Then, at 914, process 900 can route communications with the server for the FQDN according to the determination made at 912. For example, if the communications are to be tunneled, process 900 can route the communications through a tunnel.

After completing 914, process 900 can loop back to 904.

It should be understood that at least some of the above described blocks of the process of FIGS. 3 and 9 can be executed or performed in any order or sequence not limited to the order and sequence shown in and described in the figures. Also, some of the above blocks of the process of FIGS. 3 and 9 can be executed or performed substantially simultaneously where appropriate or in parallel to reduce latency and processing times. Additionally or alternatively, some of the above described blocks of the process of FIGS. 3 and 9 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems, methods, and media for intelligent split-tunneling are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for split tunneling comprising:
   a memory; and
   a hardware processor coupled to the memory and configured to:
   identify a plurality of user devices;
   determine that communications for a first device of the plurality of user devices are to be tunneled;
   receive a DNS request from a second device of the plurality of user devices;
   modify the DNS request to request meta information corresponding to a domain identified in the DNS request;
   send the DNS request to a DNS server;
   receive a response to the DNS request, wherein the response includes the meta information;
   determine that communications for the second device are not to be tunneled based at least in part on the meta information; and
   cause the communications for the first device to be tunneled and the communications for the second device to not be tunneled.

2. The system of claim 1, wherein the determining that communications for the second device are not to be tunneled is based at least in part on the meta information and a privacy protection policy for the second device.

3. The system of claim 1, wherein the determining that communications for the second device are not to be tunneled is based at least in part on the meta information and whether a TLS ClientHello message is detected in the communications for the second device.

4. The system of claim 1, wherein the hardware processor is also configured to provide a VPN client that performs tunneling of the communications for the first device.

5. The system of claim 1, wherein the meta information includes a category of the domain.

6. The system of claim 1, wherein the meta information includes a version of TLS being used by the domain.

7. The system of claim 1, wherein the meta information indicates whether other domains have an Internet Protocol (IP) address matching an IP address of the domain.

8. A method for split tunneling comprising:
   identifying a plurality of user devices using a hardware processor;
   determining that communications for a first device of the plurality of user devices are to be tunneled using the hardware processor;
   receiving a DNS request from a second device of the plurality of user devices using the hardware processor;
   modifying the DNS request to request meta information corresponding to a domain identified in the DNS request using the hardware processor;
   sending the DNS request to a DNS server using the hardware processor;
   receiving a response to the DNS request, wherein the response includes the meta information using the hardware processor;
   determining that communications for the second device are not to be tunneled based at least in part on the meta information using the hardware processor; and
   causing the communications for the first device to be tunneled and the communications for the second device to not be tunneled using the hardware processor.

9. The method of claim 8, wherein the determining that communications for the second device are not to be tunneled is based at least in part on the meta information and a privacy protection policy for the second device.

10. The method of claim 8, wherein the determining that communications for the second device are not to be tunneled is based at least in part on the meta information and whether a TLS ClientHello message is detected in the communications for the second device.

11. The method of claim 8, further comprising providing a VPN client that performs tunneling of the communications for the first device.

12. The method of claim 8, wherein the meta information includes a category of the domain.

13. The method of claim 8, wherein the meta information includes a version of TLS being used by the domain.

14. The method of claim 8, wherein the meta information indicates whether other domains have an Internet Protocol (IP) address matching an IP address of the domain.

15. A non-transitory computer-readable medium containing computer executable instructions that, when executed by a processor, cause the processor to perform a method for split tunneling, the method comprising:
   identifying a plurality of user devices;
   determining that communications for a first device of the plurality of user devices are to be tunneled;
   receiving a DNS request from a second device of the plurality of user devices;
   modifying the DNS request to request meta information corresponding to a domain identified in the DNS request;
   sending the DNS request to a DNS server;
   receiving a response to the DNS request, wherein the response includes the meta information;
   determining that communications for the second device are not to be tunneled based at least in part on the meta information; and
   causing the communications for the first device to be tunneled and the communications for the second device to not be tunneled.

16. The non-transitory computer-readable medium of claim 15, wherein the determining that communications for the second device are not to be tunneled is based at least in part on the meta information and a privacy protection policy for the second device.

17. The non-transitory computer-readable medium of claim 15, wherein the determining that communications for the second device are not to be tunneled is based at least in part on the meta information and whether a TLS ClientHello message is detected in the communications for the second device.

18. The non-transitory computer-readable medium of claim 15, wherein the method further comprises providing a VPN client that performs tunneling of the communications for the first device.

19. The non-transitory computer-readable medium of claim 15, wherein the meta information includes a category of the domain.

20. The non-transitory computer-readable medium of claim 15, wherein the meta information includes a version of TLS being used by the domain.

* * * * *